Feb. 2, 1971 JEAN-CLAUDE LECOURTIER ET AL 3,560,974
SIGNAL-CHANNEL EVALUATION NETWORK FOR MONOPULSE RADAR RECEIVER
Filed Jan. 7, 1969 5 Sheets-Sheet 4

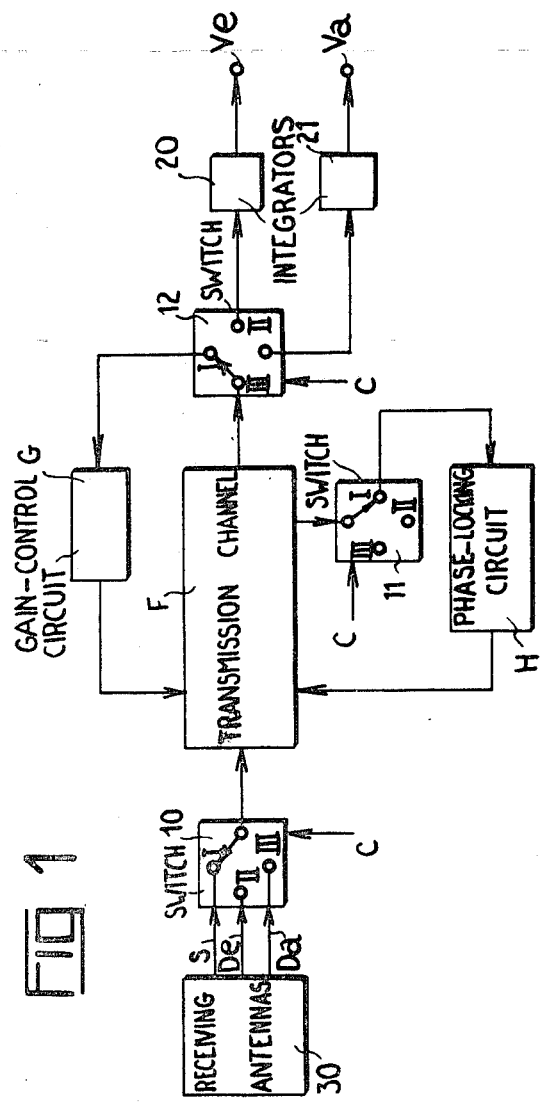

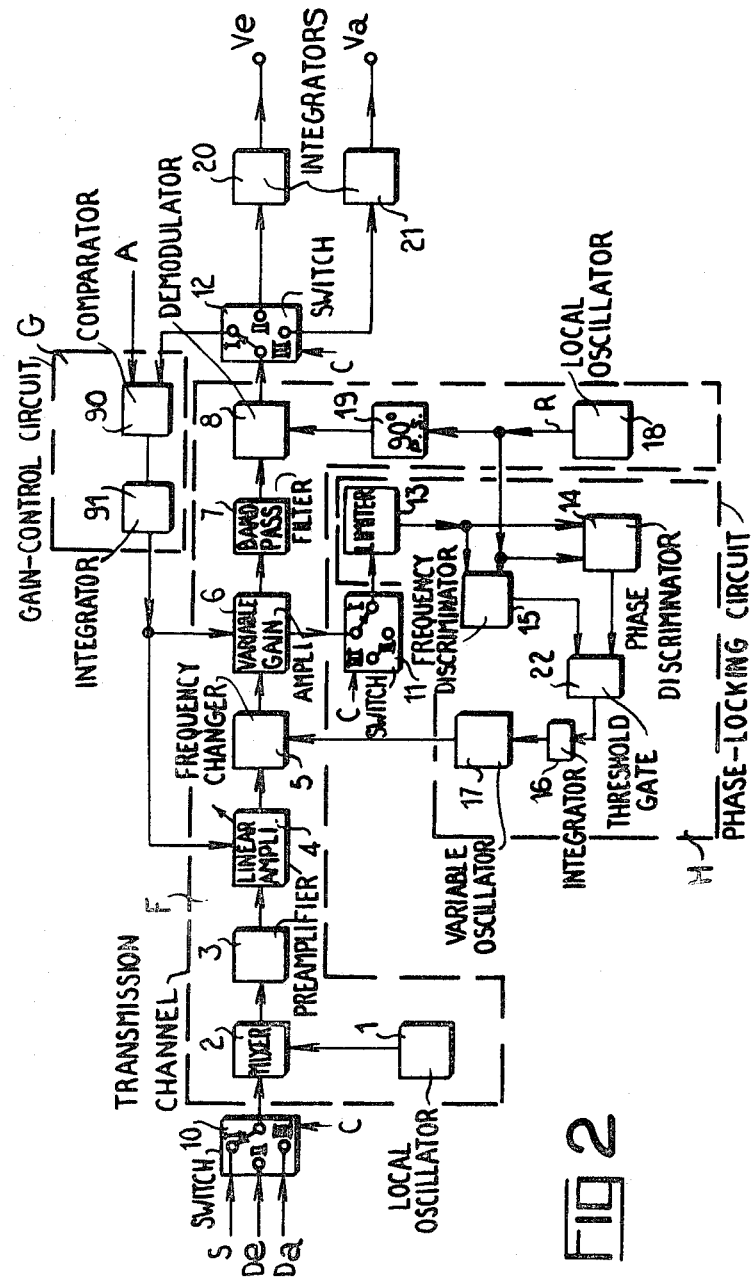

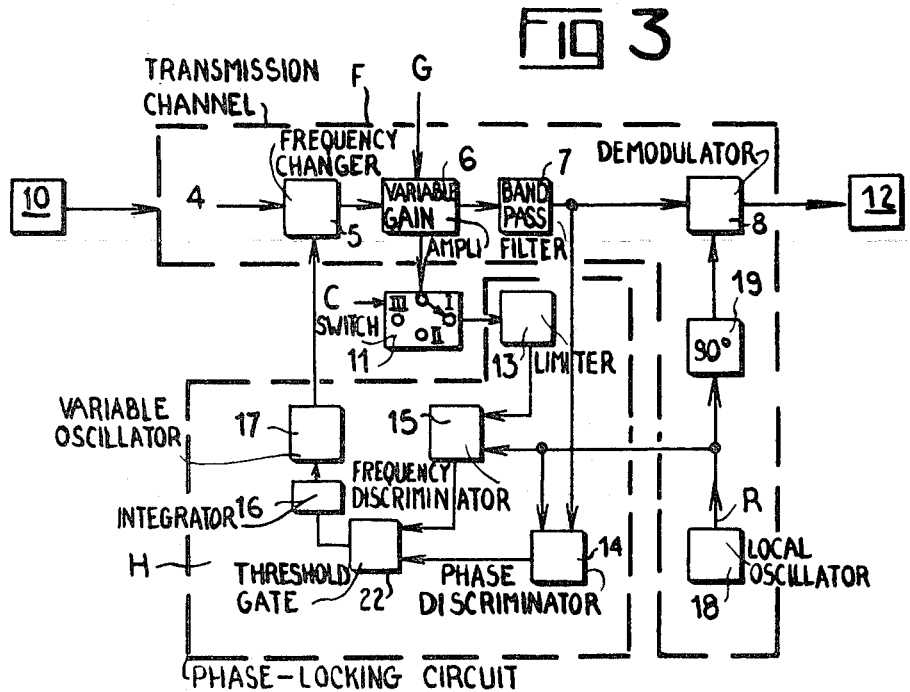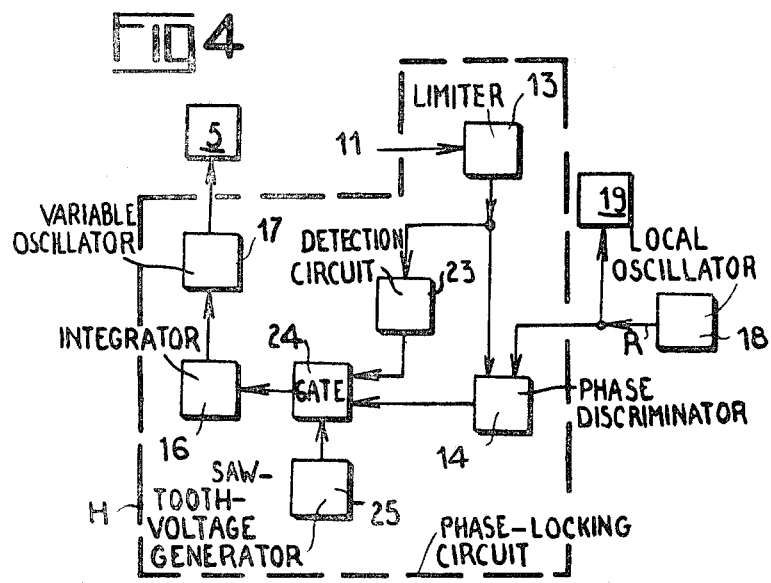

Jean C. Lecourtier
FERNAND J-M. Puverel
Inventors.

By Karl G. Ross
Attorney

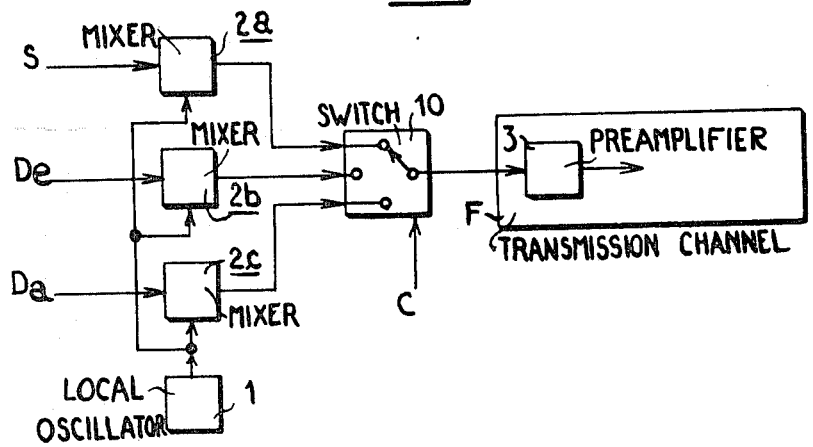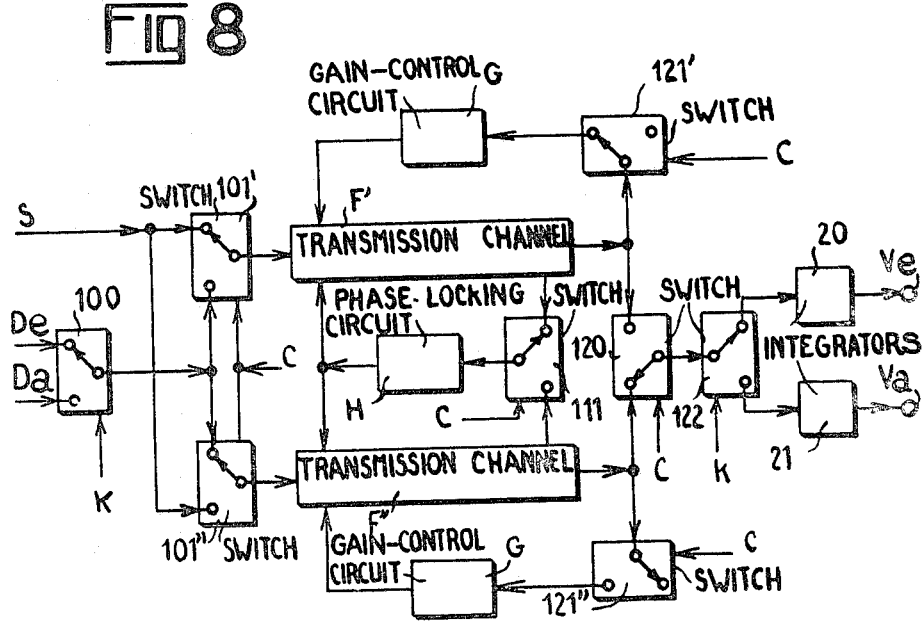

3,560,974
SIGNAL-CHANNEL EVALUATION NETWORK
FOR MONOPULSE RADAR RECEIVER
Jean-Claude Lecourtier, Vitry-sur-Seine, and Fernand
Jean-Maurice Puverel, Antony, France, assignors to
Compagnie Francaise, Thomson Houston-Hotchkiss
Brandt, Paris, France, a corporation of France
Filed Jan. 7, 1969, Ser. No. 789,514
Claims priority, application France, Jan. 9, 1968,
135,358
Int. Cl. G01s 9/22
U.S. Cl. 343—16                          14 Claims

ABSTRACT OF THE DISCLOSURE

Sum and difference signals from an array of receiving antennas of a monopulse-type radar system are sequentially transmitted to an output stage through a single-channel evaluation network. The sum signals, upon comparison with a reference oscillator, set a gain-control circuit and a phase-locking circuit which remains set during the subsequent transmittal of difference signals, voltages to the output stage.

---

Our invention relates to electrical apparatus for processing, in a single channel, a plurality of input signals each of which is a simultaneous function of more than one variable in order to derive output signals therefrom that are separate functions of the respective variables.

The invention was developed in connection with monopulse radar receiver systems and will consequently be disclosed with primary reference to that particular application. It is to be understood, however, that the concepts of the invention are applicable to other types of system in the field of communications and information transfer.

In a monopulse radar receiver, the input information serving to derive the amounts of angular displacement of a target from the reference direction in azimuth and in elevation appears in the form of signal ratios. These signal ratios in turn are obtained by comparing pairs of received signals picked up by respective pairs of antenna elements that are displaced in the horizontal and vertical planes, or an equivalent antenna array.

In one widely used form of monopulse, the so-called "sum-and-difference" system, the four crude signals picked up by two pairs of horizontally and vertically displaced antennas (or equivalent array) are combined additively and subtractively in such a manner as to produce three useful signals, the so-called azimuth difference, elevation difference and sum signals. Each of these three signals is a composite function of the azimuth and elevation displacement angles. The three signals are then processed in a suitable network which, essentially, serves to derive the ratios of the respective difference signals to the sum signal. Ideally, these two ratios are pure functions of azimuth and elevation displacements, respectively, and thus provide the desired information as to the angular position of the target relative to the reference, or "boresight," axis. The sum signal serves to derive range information.

Many different types of networks have been proposed for processing the azimuth and elevation difference and the sum signals in a monopulse receiver. Most of these networks involve the use of three channels, or sometimes two channels, through which the signals are passed and separately amplified. This imposes stringent requirements on the dynamic gain and phase characteristics of the channel amplifiers, as will be described in greater detail later, and the impairment of these characteristics with time brings with it a serious limitation on the accuracy and sensitivity of the system.

Single-channel monopulse-signal-processing networks have also heretofore been proposed, which have been based on a time-sharing technique or on the use of different frequencies for the different monopulse signals.

In the type of single-channel network wherein the signals are diversified in frequency rather than time, there necessarily results a considerable broadening in the bandwidth of the signal channel. Such an increase is prohibitive in many instances, for example where the received signals serve to convey pulse-modulated information in addition to their bare position-indication function, as is the case with secondary radar and IFF systems, and in communications with telemetering satellites.

An object of this invention is to provide an improved single-channel monopulse receiver system of improved performance characteristics, based on time-sharing technique.

This object is realized, pursuant to our invention, by the provision of first and second switch means at the input and output ends of a transmission channel provided for both the sum signal and the difference signal or signals to be delivered to an output circuit, in combination with a phase-locking circuit which stores an electric variable (e.g. voltage) representative of the phase of a sum signal transmitted over that channel during the first period of an operating cycle in which only the sum signal is applied to the channel by the first switch means, this variable being preserved throughout the cycle for utilization in a second period during which the difference signal or signals enter the channel via the first switch means while an evaluation signal is delivered by the channel via the second switch means to the output circuit; in order that this evaluation signal may be representative of the phase angle between the sum and difference signals sequentially transmitted during the cycle, the channel includes phase-modifying means (such as a frequency changer) for altering the phase of the transmitted difference signals, relative to a reefrence oscillation, in response to the magnitude of the stored variable which represents the phase of the sum signal, the magnitude and the phase of said sum signal being integrated over several cycles. Naturally, in order to allow for such phase comparison, the frequency of the reference oscillation must be virtually identical with the carrier frequency of the echo pulses. A third switch means, synchronized with the first and second switch means at opposite ends of the transmission channel, applies signals from the channel to the storage means of the phase-locking circuit only during the first period of the operating cycle so that the magnitude of the stored variable is not affected by the difference signals or signals transmitted during the second period.

According to another important feature of our invention, the transmission channel is associated with a gain-control circuit which is connectable thereto, by the aforementioned second switch means, during the first period of the cycle and includes other storage means for substantially preserving, throughout the cycle, a second electric variable (e.g. voltage), representative of the magnitude of the transmitted sum signal, this second variable serving to control a variable-gain amplifier in the channel so as to stabilize its gain at a level inversely proportional to the magnitude of the sum signal transmitted, thereby proportionately relating the level of the subsequently transmitted difference signal to that of the sum signal.

The above and other features of our invention will become more fully apparent from the following detailed description of certain embodiments given with reference to the accompanying drawing in which:

FIG. 1 is a block diagram of the overall circuitry of a radar receiver embodying our improved evaluation network;

FIG. 2 is a more detailed circuit diagram of the network shown in FIG. 1;

FIG. 3 is a similar block diagram showing a modification of part of the system of FIG. 2;

FIG. 4 is a block diagram similar to FIG. 3, illustrating another modification;

FIG. 7 is a block diagram showing a modified input circuit for the system of FIG. 2; and FIG. 8 is another block diagram representing a variant of the arrangement of FIG. 2.

Figure 5:
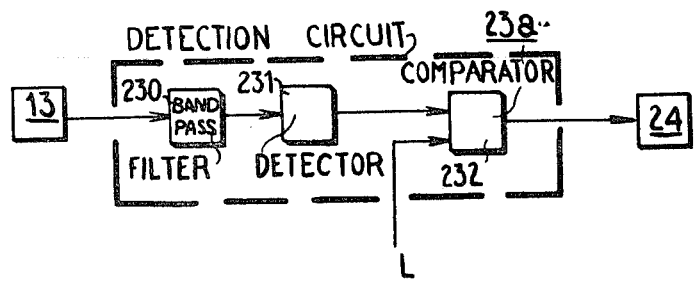
FIGS. 5 and 6 are block diagrams representing alternate embodiments of an element of the system of FIG. 4.

The system illustrated in FIG. 1 comprises a conventional array of receiving antennas 30, as hereinabove described, delivering sum signals S, difference signals $D_e$ (elevation) and difference signals $D_a$ (azimuth) to a three-position switch 10 whose operating cycle is controlled by a timing signal C from a clock circuit not shown. Switch 10, though in practice of the electronic type, has been shown for the sake of clarity as comprising a movable arm with three bank contacts respectively connected to lines S, $D_e$, $D_a$. This switch works into a transmission channel F feeding, through another three-position switch 12 controlled by signal C, a gain-control circuit G (position I), a first integrator 20 (position II) and a second integrator 21 (position III). The outputs of integrators 20 and 21, in the form of continuous voltages $V_e$, $V_a$, represent error signals to be used in the conventional manner for the evaluation of elevation and azimuth deviations of an object which is being tracked by the system.

A third switch 11, also controlled by signal C, connects an intermediate point of channel F (as more fully described with reference to FIG. 2) to a phase-locking circuit H in switch position I only; in positions II and III, the feedback loops through circuits G and H are open.

In operation, a sum signal S arriving from array 30 in a first period of an operating cycle is applied by switch 10 to channel F which at this instant is disconnected from output circuit 20, 21. The amplified sum signal sets respective storage means, more fully described below, in both loops G and H to register its magnitude and its phase. Circuit G, in response to the registered magnitude, stabilizes the gain of channel F at a level inversely proportional to that magnitude; this means that the absolute magnitude of a subsequently transmitted difference signal is equal to $|D|/|S|$ where D stands for either the elevation signal $D_e$ or the azimuth signal $D_a$. The phase of this difference signal D is adjusted by the loop H, in position II or III of the ganged switches 10–12, by the loop H so that the output of channel F bears a definite relationship with the phase angle $\varphi$ included between the original vectors $\vec{S}$ and $\vec{D}$ of the sum and difference signals.

Circuits F, G and H are shown in greater detail in FIG. 2. Channel F is seen to include a local oscillator 1 connected, along with switch 10, to a mixer 2 stepping down the carrier frequency of the incoming signals S, $D_e$, $D_a$ to an intermediate-frequency level. The I-F output of mixer 2 is fed, through a preamplifier 3, to a linear amplifier 4 of variable gain controlled by the output of circuit G. Amplifier 4 works into a frequency changer 5 and also receives a control signal from a variable oscillator 17 in circuit H. The modified signals produced by frequency changer 5, after passing through another linear variable-gain amplifier 6 also controlled by circuit G, are delivered on the one hand through a band-pass filter 7 to a coherent demodulator 8 and, on the other hand, through switch 11 (in position I thereof) via a limitor 13 to a phase discriminator 14 and a frequency discriminator 15. A local oscillator 18 supplies a reference oscillation R, substantially at the carrier frequency of the oncoming signals, to networks 14 and 15 and also feeds the coherent demodulator 8 through a 90° phase shifter 19; demodulator 8 has its output connected by switch 12, in position I thereof, to a voltage comparator 90 in loop G also receiving a reference potential A, the output of this comparator being integrated in a network 91 before being applied to the control electrodes of amplifiers 4 and 6. In the other two switch positions, the modulator 8 works directly into inegrator 20 or 21.

The two networks 14 and 15 of loop H supply corrective voltages, through a threshold gate 22, to an integrator 16 controlling the adjustable oscillator 17. Integrators 16 and 91, which may include pulse-broadening circuitry of the so-called boxcar type, are effective to control the operation of elements 5 and 4, 6 respectively, in a manner decreasing the error signals in their respective inputs as is well known per se. Frequency discriminator 15 brings about a relatively coarse adjustment of oscillator 17, e.g. to compensate for Doppler shifts, whereas phase discriminator 14 carries out a relatively fine adjustment once substantial identity in the output frequencies of amplifier 6 and oscillator 18 has been achieved. A new coarse adjustment of oscillator 17 for each cycle thus becomes unnecessary as its frequency and phase are stored in integrator 16. Owing to the controlling action of oscillator 17, frequency shifter 5 modifies the phase of the carrier of sum signal S so as to make it substanitally cophasal with reference oscillation R. As the integrator 16 retains the control voltage effecting such phase shift, the subsequently appearing difference signal $D_e$ or $D_a$ is similarly-phase-shifted but, with switch 11 now disconnecting amplifier 6 from limiter 13, is passed only into integrator 20 or 21 by way of filter 7 and demodulator 8. Its heterodyning with the phase-shifted output of oscillator 18 in demodulator 8 results in the application to switch 12 of an evaluating signal of a magnitude proportion to $$\frac{D}{|S|} \cos \varphi$$

having regard to the operation of gain-control circuit G as explained above.

FIG. 3 shows the possibility of utilizing the noise-suppressing effect of filter 7 in the phase loop H by connecting the signal-receiving input of phase discriminator 14 directly to the output of this filter, with omission of the connection between limiter 13 and discriminator 14 shown in FIG. 2. It will be understood that phase discriminator 14 will not become effective until frequency discriminator 15, through its control of oscillator 17, has modified the output frequency of amplifier 6 sufficiently to allow a comparison between the phases of that output frequency and of reference oscillation R. If desired, a further switch similar to and ganged with switch 11 may be inserted in the connection from filter 7 to discriminator 14 illustrated in FIG. 3.

In FIG. 4 we have shown an alternate type of frequency-sensitive network to be used in lieu of the discriminator 15 of FIG. 2 or 3. This network comprises a detector circuit 23 working into a gate circuit 24 jointly with a sawtooth-voltage generator 25, this generator together with integrator 16 and oscillator 17 constituting a voltage source which steps the element 5 through a range of output frequencies including the frequency of oscillation R, this stepping action being aimed at setting the phase-locking loop H in oscillation. At the instant when the two frequencies in the input of phase discriminator 14 are equal, gate 24 responds to the output of detector 23 to give passage to a further control voltage from discriminator 14 with resultant vernier adjustment of the voltage stored in the integrator 16 whereas the action of the sawtooth-voltage generator 25 upon integrator 16 is interrupted.

One mode of realization of circuit 23 has been illustrated at 23a in FIG. 5. This circuit comprises a narrow-band filter 230 working into a detector 231 which in turn feeds a voltage comparator 232 also receiving a reference potential L.

Figure 6:
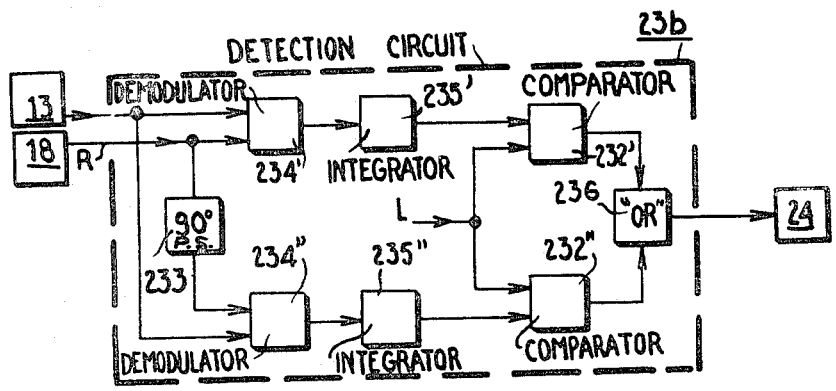

In an alternate embodiment shown at 23b in FIG. 6, this circuit comprises two parallel branches each having a demodulator 234', 234" connected to receive the outputs of elements 13 and 18, these demodulators working into respective integrators 235', 235" whose outputs in turn are fed to comparators 232', 232" also receiving the reference potential L; a 90° phase shifter 233 for the reference oscillation R is inserted between oscillator 18 and demodulator 234". Comparators 232' and 232" feed the gate 24 through an OR circuit 236.

As illustrated in FIG. 7, the mixer 2 in the output of switch 10 may be replaced by three individual mixers 2a, 2b, 2c respectively inserted in lines S, $D_e$, $D_a$ in the input of that switch, these three modulators being supplied with a heterodyning frequency from local oscillator 1 to establish an intermediate frequency in the input of switch 10. This modification allows greater freedom in the design of the switch which, like its companion switches 11 and 12, may include conventional solid-state devices such as diodes or transistors.

Since the sum signal S will generally be much more powerful than either of the two difference signals $D_e$, $D_a$, the first period (switch position I) may be made considerably shorter than either of the two intervals of the second period (switch positions II and III).

The consecutive rather than simultaneous transmission of the several signals, as hereinabove described, may result in a certain diminution of mean signal strength by about 5 db. In order to avoid this loss of useful energy, we may divide our signal-transmission channel F into a pair of alternately operating paths F', F" as illustrated in FIG. 8, the loop H being common to the two paths whereas each of them has its own gain-control circuit G', G" in a loop containing a switch 121' or 121". Other switches 101', 101" in the inputs of subchannels F' and F" serve to apply the sum signal S alternately to these subchannels and, during the remainder of the operating cycle, successively deliver thereto the difference signals $D_e$, $D_a$ by way of an auxiliary switch 100 responsive to timing pulses K; the latter pulses may occur at twice the rate of pulses C which periodically reverse the switches 101', 101", 121" as well as several further switches 111, 120 and 122 replacing switches 11 and 12 of the preceding figures. Thus, the illustrated switch position of FIG. 8 represents a first period in which sum signal S is fed to path F' whose gain-control loop G' is concurrently closed and which also is connected at that instant across the phase loop H; at the same time, the difference signals $D_e$, $D_a$ are consecutively fed through path F" where they are treated, under the control of loop "G" and H as heretofore described, preparatorily to transmission to integrators 20 and 21. In the second period of the operating cycle, in which the positions of all the switches (other than switch 100) are reversed, the roles of the two subchannels F' and F" are interchanged.

We claim:
1. In a monopulse radar system having receiving antenna means, input means for deriving sum and difference signals from pulses of predetermined carrier frequency reflected by extraneous objects, and output means for converting said sum and difference signals into an indication of the position of such objects, the combination therewith of:
   a transmission channel inserted between said input and output means;
   first switch means interposed between said input means and said channel for alternately applying sum and difference signals to the latter during a first period and a second period, respectively, of a predetermined operating cycle;
   second switch means interposed between said channel and said output means for connecting said channel to said output means during said second period only;
   a phase-locking circuit including storage means for substantially preserving an electric variable representative of the phase of said sum signals relative to a reference oscillation substantially equaling said carrier frequency, said phase-locking circuit being provided with third switch means synchronized with said first and second switch means for applying signals from said channel to said storage means during said first period only;
   phase-modifying means in said channel connected to said storage means for altering the phase of said difference signals relative to said reference oscillation, in response to the magnitude of said variable, during said second period;
   and phase-comparison means in said channel connected to receive the phase-modified difference signals and said reference oscillation for deriving therefrom, for delivery to said output means during said second period, evaluation signals representative of the phase angle between said sum and difference signals.

2. The combination defined in claim 1 wherein said input means includes a plurality of parallel lines for respectively feeding said sum and difference signals to said channel, further comprising mixer means in said lines for reducing the frequencies of the signals thereof.

3. The combination defined in claim 1, wherein said channel comprises two identical transmission paths, said phase-modifying means being duplicated in said paths for alternate connection to said storage means by said third switch means, said first switch means being operative to apply said sum signals to one of said paths concurrently with application of said difference signals to the other path and vice versa, said second switch means being operative to connect said paths alternately to said output means.

4. The combination defined in claim 1 wherein said input means included a first line for delivering said sum signals to said channel, a second line for delivering one type of difference signal to said channel, and a third line for delivering another type of difference signal to said channel, said first switch means connecting said channel to said first line in said first period and successively to said second and third lines in said second period.

5. The combination defined in claim 4, wherein said first switch means comprises a main switch for intermittently connecting said channel to said first line and an auxiliary switch for alternately connecting said second and third lines to said channel through said main switch upon disconnection of said first line.

6. The combination defined in claim 1, further comprising variable-gain amplifier means in said channel and a gain-control circuit connectable to said channel by said second switch means to receive said sum signal therefrom during said first period, said gain-control circuit including other storage means for substantially preserving a second electric variable representative of the magnitude of said sum signals, said other storage means being connected to said amplifier means for stabilizing the gain thereof in response to said second variable at a level inversely proportional to the magnitude of said sum signals.

7. The combination defined in claim 6 wherein said phase-modifying means includes a frequency changer in said channel beyond said amplifier means and a source of actuating voltage for said frequency changer controlled by the first-mentioned storage means.

8. The combination defined in claim 7 wherein said frequency changer is effective to make the carrier frequency of said sum signals substantially cophasal with said reference oscillation, said phase-comparison circuit comprising a demodulator beyond said frequency changer and circuit means for applying to said demodulator, together with the phase-modified difference signals, a local oscillation in quadrature with said reference oscillation.

9. The combination defined in claim 7 wherein said source of actuating voltage is an oscillator of adjustable frequency.

10. The combination defined in claim 7 wherein said phase-locking circuit further includes a frequency-sensitive first network and a phase-sensitive second network, said storage means including an integrator for corrective voltages from said networks.

11. The combination defined in claim 10 wherein said channel further includes filter means beyond said frequency changer, said third switch means being connected to said channel at a location between said filter means and said frequency changer for applying the unfiltered output of the latter to at least said first network.

12. The combination defined in claim 11 wherein said second network is connected to said channel at a location beyond said filter means.

13. The combination defined in claim 10 wherein said first network includes detector means responsive to the frequency of said reference oscillation in the output of said frequency changer and means coupled to said source of actuating voltage for stepping said frequency changer through a range of output frequencies.

14. The combination defined in claim 13 wherein said detector means comprises a pair of branch circuits including respective demodulators connected to combine the output of said frequency changer with two local oscillations of 90° phase difference and of the frequency of said reference oscillation.

References Cited

UNITED STATES PATENTS

| | | | |
|---|---|---|---|
| 2,784,400 | 3/1957 | Ehrenfried | 343—165D |
| 3,181,160 | 4/1965 | Pichafroy | 343—165D |
| 3,467,963 | 9/1969 | Van Popta | 343—165D |
| 3,495,246 | 2/1970 | Schoneborn | 343—165D |

RODNEY D. BENNETT, JR., Primary Examiner

M. F. HUBLER, Assistant Examiner